United States Patent
Plut

(10) Patent No.: US 8,579,442 B2
(45) Date of Patent: Nov. 12, 2013

(54) ADVERTISEMENT CONTENT SELECTION AND PRESENTATION

(75) Inventor: William J. Plut, Los Altos, CA (US)

(73) Assignee: Transpacific Image, LLC, Wilmington, DE (US)

( * ) Notice: Subject to any disclaimer, the term of this patent is extended or adjusted under 35 U.S.C. 154(b) by 215 days.

(21) Appl. No.: 12/472,534

(22) Filed: May 27, 2009

(65) Prior Publication Data

US 2010/0306022 A1 Dec. 2, 2010

(51) Int. Cl.
*G03B 21/00* (2006.01)
*G02B 21/36* (2006.01)
*G06Q 30/00* (2012.01)

(52) U.S. Cl.
USPC .......... 353/39; 353/122; 705/14.4; 705/14.64

(58) Field of Classification Search
USPC ............... 353/39, 46, 85, 121–122; 705/14.4, 705/14.49, 14.51, 14.6, 14.64, 14.73; 725/40, 47; 348/563–564
See application file for complete search history.

(56) References Cited

U.S. PATENT DOCUMENTS

| | | | | |
|---|---|---|---|---|
| 3,020,798 | A * | 2/1962 | Chrisman | 353/122 |
| 3,198,066 | A * | 8/1965 | McGhee | 353/28 |
| 4,739,567 | A * | 4/1988 | Cardin | 40/471 |
| 5,570,138 | A * | 10/1996 | Baron | 348/744 |
| 6,344,853 | B1 * | 2/2002 | Knight | 345/629 |
| 6,489,934 | B1 * | 12/2002 | Klausner | 345/1.1 |
| 6,783,252 | B1 * | 8/2004 | Cambron | 353/122 |
| 6,940,528 | B2 * | 9/2005 | Fukui et al. | 345/634 |
| 7,429,983 | B2 * | 9/2008 | Islam | 345/204 |
| 7,431,464 | B2 * | 10/2008 | Park | 353/97 |
| 7,832,877 | B2 * | 11/2010 | Yun et al. | 353/99 |
| 7,936,361 | B2 * | 5/2011 | Aufranc et al. | 345/640 |
| 2002/0010626 | A1 * | 1/2002 | Agmoni | 705/14 |
| 2004/0211100 | A1 * | 10/2004 | Scherba | 40/610 |
| 2005/0183303 | A1 * | 8/2005 | Simonsen et al. | 40/560 |
| 2005/0219473 | A1 * | 10/2005 | Moriyama et al. | 353/79 |
| 2006/0136295 | A1 * | 6/2006 | Bobick et al. | 705/14 |
| 2006/0262280 | A1 * | 11/2006 | Duffield et al. | 353/46 |
| 2007/0030385 | A1 * | 2/2007 | Crawford et al. | 348/468 |
| 2007/0208610 | A1 * | 9/2007 | Pisaris-Henderson et al. | 705/10 |
| 2007/0258016 | A1 | 11/2007 | Galligan et al. | |
| 2007/0279509 | A1 * | 12/2007 | Tan et al. | 348/333.1 |

(Continued)

FOREIGN PATENT DOCUMENTS

| | | |
|---|---|---|
| JP | 2001021992 | 1/2001 |
| KR | 1020000037250 A | 7/2000 |

(Continued)

OTHER PUBLICATIONS

Translation of KR 10-2002-0077634.*

(Continued)

*Primary Examiner* — Tony Ko
*Assistant Examiner* — Jori S Reilly-Diakun
(74) *Attorney, Agent, or Firm* — Turocy & Watson, LLP

(57) ABSTRACT

Systems, devices and methods that enable advertisement on mobile computing applications are provided. More specifically, described herein are devices and methods that are capable of delivering relatively more friendly advertising information to a user while causing less interference on graphics-based user interfaces of such devices. Integral projector modules which may be embedded in mobile computing devices are also provided. These modules may be capable of externally projecting advertising content upon most any surface.

12 Claims, 15 Drawing Sheets

(56) References Cited

U.S. PATENT DOCUMENTS

| | | |
|---|---|---|
| 2008/0004953 A1* | 1/2008 | Ma et al. .................. 705/14 |
| 2008/0043157 A1* | 2/2008 | Jones ...................... 348/744 |
| 2008/0059571 A1 | 3/2008 | Khoo |
| 2008/0086368 A1* | 4/2008 | Bauman et al. ........... 705/14 |
| 2008/0092071 A1* | 4/2008 | Chiu ........................ 715/764 |
| 2009/0051832 A1* | 2/2009 | Banks et al. ............... 349/7 |
| 2009/0076908 A1* | 3/2009 | Ingleshwar ................ 705/14 |

FOREIGN PATENT DOCUMENTS

| KR | 1020020077634 A | 10/2002 |
|---|---|---|
| KR | 10-0393054 | 7/2003 |
| KR | 100826331 B1 | 5/2008 |

OTHER PUBLICATIONS

International Search Report and Written Opinion for International Application No. PCT/US2010/029940, mailing date Jan. 4, 2011, 10 pages.

Japanese Office Action mailed Jan. 22, 2013 for Japanese Patent Application No. 2012-513073.

Korean Office Action dated Aug. 20, 2013 for Korean Patent Application 10-2011-7031215, 4 pages.

\* cited by examiner

ADVERTISEMENT CONTENT SELECTION AND PRESENTATION

BACKGROUND

Online advertising is an important advertising medium that continues to grow rapidly as use of and access to the Internet expands. In particular, the Internet continues to make available ever-increasing amounts of information which may be stored in databases and accessed therefrom. Additionally, with the proliferation of portable terminals (e.g., notebook computers, cellular telephones, personal data assistants (PDAs), smartphones and other similar communication devices), users are becoming more mobile, and hence, more reliant upon information accessible via the Internet. Accordingly, the connectivity available via the Internet is frequently used to "surf" or lookup information available on the Web.

Mobile computing applications such as electronic mail (e-mail) or Internet browsing has particularly become more and more popular on mobile devices. Unfortunately, online advertising has not effectively leveraged the proliferation of mobile devices, especially not on mobile devices having small display screens. Consider cellular phones, smart phones or PDA devices as examples, most of these devices have a display screen size about two inches to four inches. This limited display real estate makes it difficult, if not impossible, to effectively place advertising information onto the screen together with user information such as, browser search results, video, application user interfaces, etc. Conventional systems typically replace user content with advertisement content. As may be understood, this diminishes the user experience and compromises effectiveness of the advertisement.

DETAILED DESCRIPTION

Figure 1:
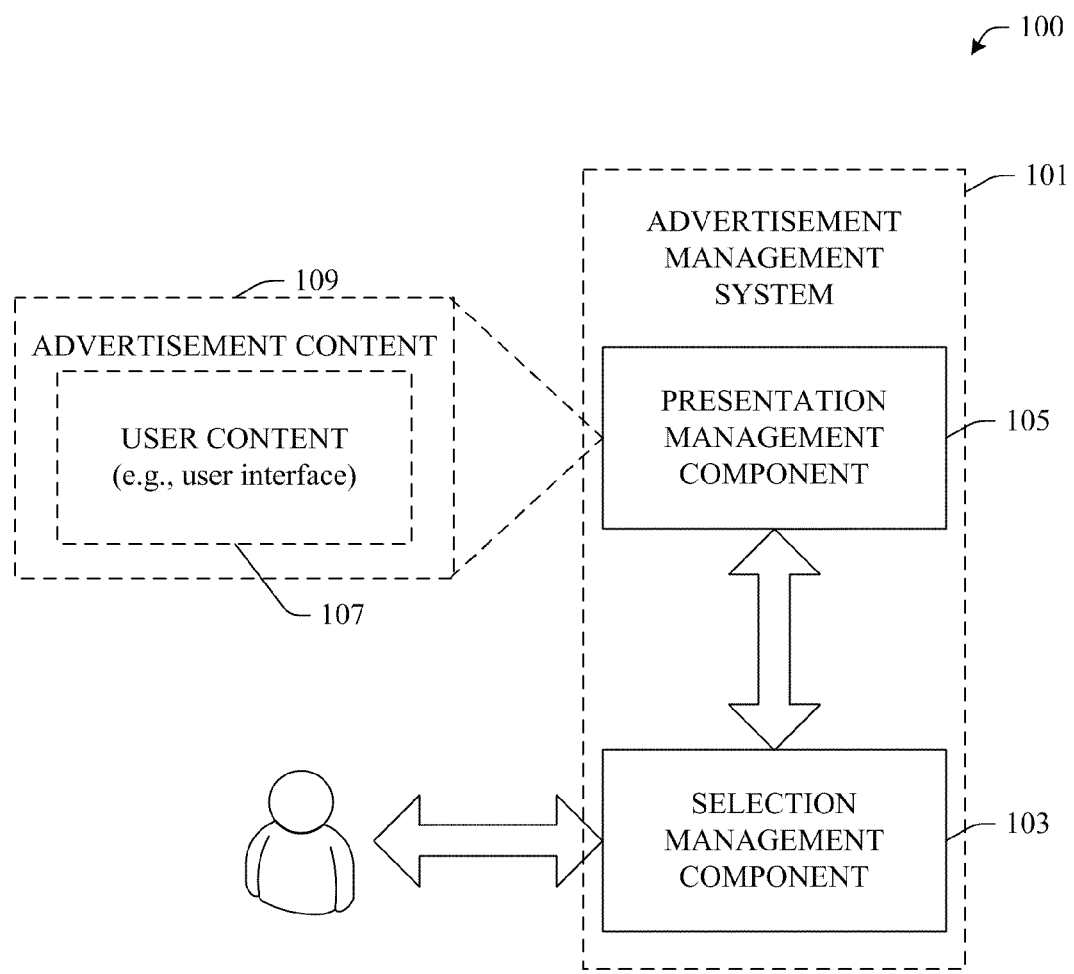
FIG. 1 illustrates an example block diagram of a system that facilitates placement of advertisement content outside the scope of user content in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

As used in this application, the terms "component," "module" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

As used herein, the term to "infer" or "inference" refer generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives may be employed. The terms "screen," "display," "web page," and "page" are generally used interchangeably herein. The pages or screens are stored and/or transmitted as display descriptions, as graphical user interfaces, or by other methods of depicting information on a surface or screen (whether personal computer (PC), personal digital assistant (PDA), mobile telephone, or other suitable device, for example) where the layout and information or content to be displayed on the page is stored in memory, database, or another storage facility, either local or remote.

The innovation disclosed and claimed herein, in aspects thereof, comprises a system (and corresponding methodologies) that enhances presentation of advertisement content to a user. The system partitions a display surface or screen such that advertisement content does not interfere with core user content. For example, advertisement content may be displayed in a border region that outside user content (e.g., application interfaces, multi-media content). By strategically positioning the advertisements upon a display without compromising user content, a positive user experience may be maintained.

In other aspects of the subject innovation a projection mechanism is placed within a mobile device. The projector is capable of displaying the strategically positioned content upon an external surface. In aspects, the projection mechanism is a laser-based mechanism that employs a red, green and blue laser set to effect the display.

In yet other aspects thereof, an artificial intelligence or MLR component is provided that employs a probabilistic and/or statistical-based analysis to prognose or infer an action that a user desires to be automatically performed.

Referring initially to the drawings, FIG. 1 illustrates a system 100 that facilitates presentation of advertisement content together with user content in a manner that effectively utilizes presentation area. As will be described in greater detail below, in aspects, the presentation area may be an internal screen of a mobile device such as a cell phone, smartphone, PDA, personal media player, or the like. Additionally, the presentation area may be a surface upon which image data that includes advertisement content and user content is projected or otherwise displayed. By way of example, in aspects, a projection means internal to a mobile device is employed to display the image(s) upon a surface.

As illustrated in FIG. 1, system 100 generally includes an advertisement management system 101 that enables effective use of presentation screen or surface real estate. In addition to configuring advertisements so as to not interfere with user content, the advertisement management system 101 is also capable of selecting appropriate advertisement content for rendering to a user. Still further, the advertisement management system 101 may display the advertisement and user content either internally (e.g., on a built-in screen) or externally (e.g., on a surface via a projecting means). Each of these features, functions and benefits of the innovation will be better described upon a review of the figures that follow.

With continued reference to FIG. 1, advertisement management system 101 may include a selection management component 103 and a presentation management component 105. Together, these sub-components (103, 105) make possible selection and rendering of advertisement data together with user content. By way of example, as shown, user content 107 may be displayed upon an inner region or area of a display while advertisement content 109 may be presented in a region that borders the user content region. As will be understood, displaying advertisement content 109 in this outline or border will alleviate interference with user content. Thus, a user will most likely have a more pleasant user experience while still being exposed to advertisements.

As described herein, in aspects, the advertisements displayed may be context-based thereby increasing effectiveness by targeting advertisements. It will be understood that targeted advertisements may greatly enhance advertisement effectiveness. In one example, the selection management component 103 may monitor Internet browser activity within the user content area 107. Information gathered (e.g., user queries) may be utilized by the selection management component 103 to retrieve advertisements related to the current activity or context of the user. Accordingly, the presentation management component 105 may organize, arrange or otherwise configure the advertisement data to present it in an area that surrounds the user content.

As described above, this display may be rendered upon a screen internal to the mobile device or, alternatively, projected upon a surface exterior to the mobile device. In these aspects, a projection means internal to device may be used to externally project the content upon a surface (e.g., wall, ceiling, desktop). These aspects will be better understood upon a review of FIG. 2.

Figure 2:
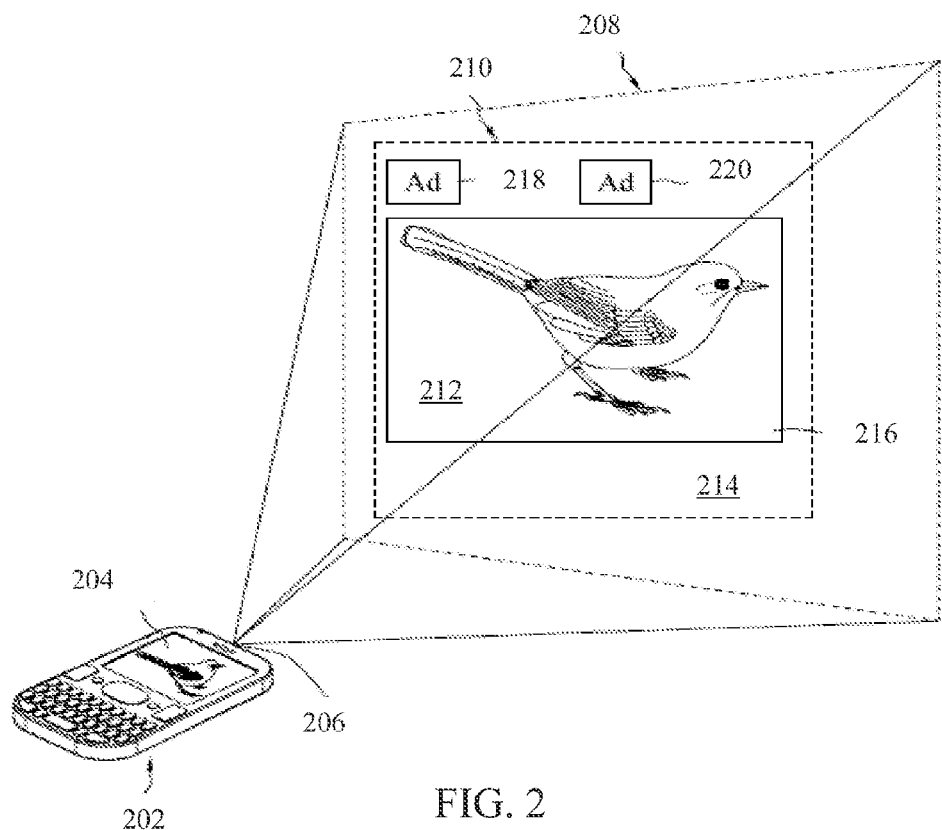
FIG. 2 illustrates a mobile computing device projecting an image on an external receiving surface in accordance with some embodiments.

Referring now to FIG. 2, in these aspects, a mobile computing device 202, such as a cellular telephone, PDA, smartphone or a notebook computer, comprises a built-in screen 204 and a built-in projector module 206. As illustrated, the projector module 206 is capable of projecting images externally on a receiving surface. Given a distance between the receiving surface and the projection lens of the projector module 202, a total projectable area 208 represents the maximum territory that projected images may be displayed according to mechanical limitations. In these embodiments, a keystone correction function, which will be introduced in one of the following paragraphs, is applied; the maximum image size 210 after keystone correction projected by the projection module 206 is less than the total projectable area 208.

The total projectable area 208 may include a first area 212 and a second area 214; in these embodiments, the sum of the first area 212 and the second area 214 is equal to the maximum image size 210. In aspects, background 216 which is intended for use with a graphics-based user interface (GUI) is displayed on the first area 212 and is also displayed by the built-in screen 204. According to several embodiments, after a user submit a query, e.g., keyword searching through an Internet browser, the mobile computing device 202 may receive query response data and/or advertising information from a remote server through a connecting network. In some embodiments, the connecting network may be a wireless network such as GPRS, CDMA, 3G, Wi-Fi, WiMax, etc. At least part of the advertising information is projected on the second area 214. In some embodiments, the second area 214 is visually un-used while there is no advertising information to be displayed, e.g., the pixels of the second area 214 displays dark, black or off state in such conditions.

Background 216 may comprise video information for display according to orthogonal image coordinates. The background video information refers to data for display according to a pixel arrangement to produce a visual representation of the data. The data may be stored in a logical manner using values for each pixel; in some embodiments, it is based on a given pixel resolution that may or may not match the display device resolution. Picture files used in a background may comprise video information stored as a bitmap, which comprises an array of luma and/or chroma values for each pixel in the stored image. Color bitmaps may be stored as ".BMP" files using pixel depths such as 8, 16, 24, and 32 bits. Other graphics formats, such as GIF, JPEG, and others, may also be used to store a background image.

The orthogonal image coordinates refer to a stored data format, positional arrangement for pixels, or an assumed output format for display of the video information. In some embodiments, pixel values are assigned or stored according to a positional arrangement of pixels in a planar image, such as a right angle x-y coordinate system. The x-y coordinate pixel locations are then used to determine where video data is output on an image, such as that provided by the built-in screen 204 which may be an LCD (liquid crystal display) screen or an optical modulator included in the projector module 206.

Characterizing video information according to orthogonal image coordinates denotes how they are stored and/or intended for display, and not necessarily how they are actually cast or displayed. Thus, for several present embodiments, the output image of the projector module 206 may not always be truly orthogonal. For a CRT (cathode-ray tube) monitor for example, it is understood that the actual image coordinates may not always be perfectly orthogonal to a viewer, e.g., due to slight curvature in the output screen for CRT monitor. Image coordinates produced for a projected image may also not always be truly orthogonal. When a projection lens that outputs the video information for the projector module 206 has a central axis that is not perpendicular to a receiving surface, keystone distortion of the image may appear. Keystone distortion often produces a trapezoidal image for rectangular video information intended for display according to orthogonal image coordinates. In some embodiments, the mobile computing device 202 may incorporate a digital keystone correction tool for reducing keystone distortion.

For projector module 206, total projectable area 208 may be characterized using the maximum pixel dimensions for an optical modulator producing images when substantial keystone distortion is not applied. In this case, the maximum image size is typically limited based on the optical modulation device (DMD or LCD) resolution. Linear dimensions for the maximum image size 210 will vary with the distance between the receiving surface and projection lens of the projector module 206, as well as a splay angle for the projector module 206, but may be measured on the image, after any keystone distortion has been suitably corrected. When substantial keystone correction is applied, such as embodiments shown as FIG. 2, the maximum image size 210 is the maximum image size available after any keystone distortion has been substantially corrected.

A perimeter of background 216 bounds background video information included in background 216 and acts as a border for the background size and shape. The perimeter comprises the outermost pixels for the image, such as the outer pixels for a bitmap picture fit to the first area 212.

In embodiments, perimeter also determines an allowable usable area for a graphics-based user interface (GUI). The usable area defines visual output limits and user input limits for the graphics-based user interface. Thus, the usable area establishes spatial limits for display of graphics used by programs operated with the graphics-based user interface. For example, the perimeter determines the visual limits for the display of pointers, windows, graphics controls, browsers, and other visual output included in the graphics-based user interface or programs run on the mobile computing device 202 that employs the graphics-based user interface.

In embodiments, background 216 size limits dimensions for a window opened or displayed at full size. Similarly, a window browser opened at full size may be limited in size, shape and aspect ratio to the perimeter, minus any space reserved for tool bars and other constantly visible graphics components. The perimeter also determines the limit for user input, such as manipulating a pointer, opening a window, expanding or moving a window, moving a graphics control or other graphics components, etc. In addition, the perimeter defines spatial limits that bound programs and program actions associated with the graphics-based user interface. These boundaries, borders, frames, and other spatial arrangements will be better understood upon a review of the figures infra.

Figure 3:
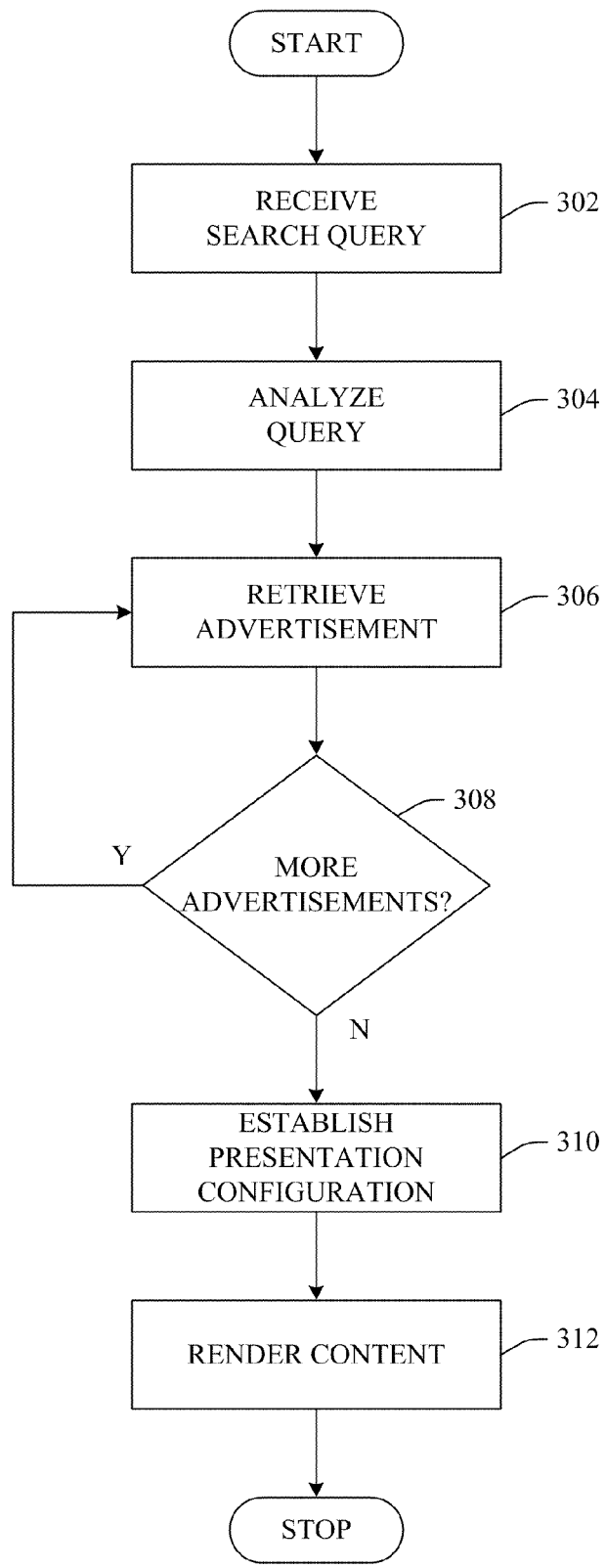
FIG. 3 illustrates an example flow chart of procedures that facilitate selection and configuration of content for display in accordance with aspects of the innovation.

FIG. 3 illustrates a methodology of rendering advertisement content in accordance with aspects of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302, search query information is received. For example, the innovation may monitor user computing activity in order to establish content, topic, content, etc. related to either the user or their current activity. The query may be analyzed at 304 to establish the aforementioned criteria. For example, keywords in the query may be analyzed to establish that the user is searching for sports bars in a particular locale. Once established, advertisements may be retrieved at 306. Here, rules-based logic may be employed to establish which advertisements to retrieve based upon the analysis. It is to be understood that, although the example considers current activity or context, other aspects exist whereby advertisements are served based upon most any rules or desired criterion.

A determination is made at 308 if, e.g., in accordance with the applicable rules, additional advertisements are to be retrieved. If so, the methodology returns to 306 as shown. If not, the methodology continues to 310 where presentation configuration is established. Here, the user content and advertisement presentation areas may be established. Additionally, placement of the individual advertisement(s) within the border will also be established and configured.

Finally, at 312, the content is rendered. For example, as a user works on a computing device, e.g., surfing the Internet, the advertisements served within the outer border may be consistently changed as a function of user context, interests, demographics, or other desired targeting factor. Similarly, it is to be appreciated that advertisements may also be served at random as desired by the user, advertiser, or host service (e.g., ISP (Internet service provider), cell phone service provider).

Figure 4:
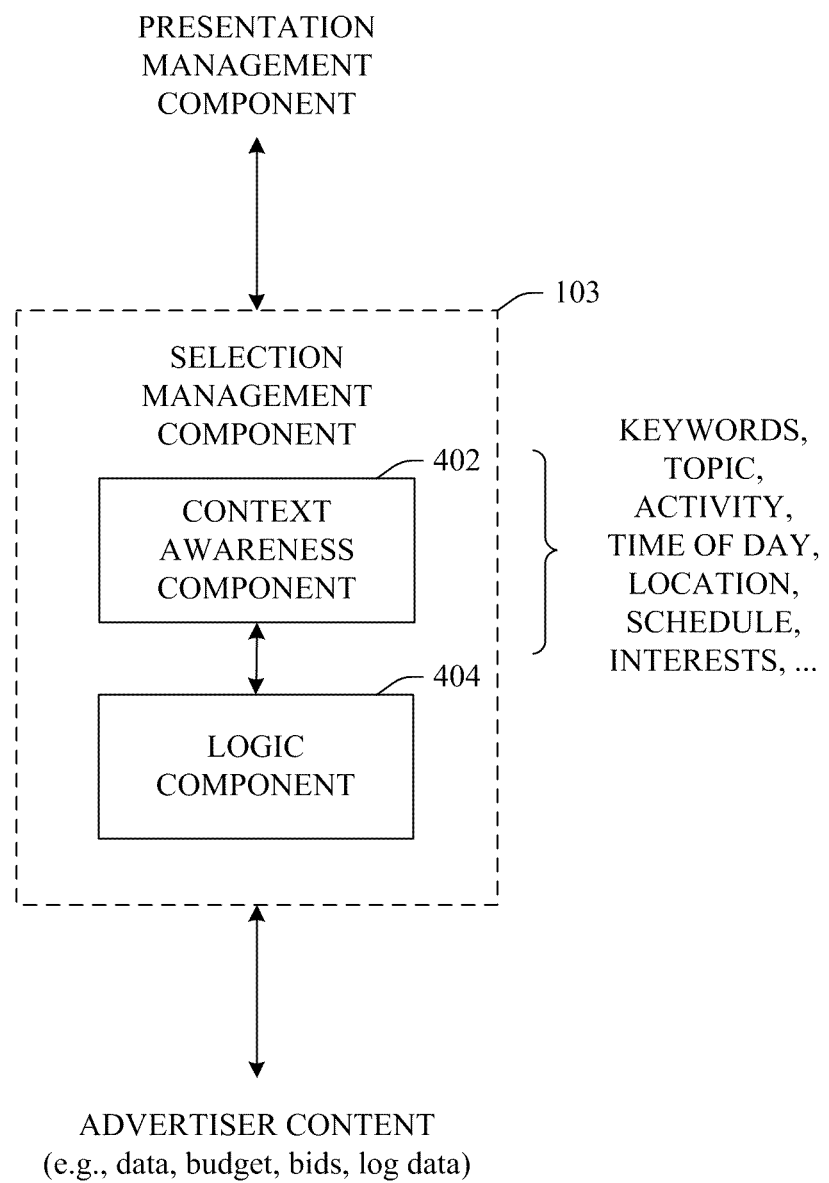
FIG. 4 illustrates an example block diagram of a selection management component in accordance with aspects of the innovation.

Referring now to FIG. 4, an example block diagram of a selection management component 103 is shown in accordance with aspects of the innovation. As described supra, in one example, the system may consider context in processing or targeting advertisements. Accordingly, selection management component 103 may include a context awareness component 402 that is capable of processing most any contextual factor to assist in effectively and comprehensively targeting advertisements.

As shown, a context awareness component 402 may consider factors, including but not limited to, keywords, topic, activity, time of day, location, schedule, interests, etc. to comprehensively select and therefore target advertisements. While the example of FIG. 4 employs contextual awareness, it is to be understood that other aspects may merely apply predetermined rules or randomly select advertisements as appropriate.

A logic component 404 may be employed to assist in determination of proper advertisements. As described supra, the logic component may employ rules or machine learning and reasoning (MLR) mechanisms to assist in targeting advertisements. In other words, the system may be preprogrammed using rules which define reaction scenarios. On the other hand, the system may be trained and/or learn based upon user activity, history, preferences or the like.

In an example, the subject innovation (e.g., in connection with advertisement selection) may employ various MLR-based schemes for carrying out various aspects thereof. For example, a process for determining which advertisement to select, how/where to render, etc. may be facilitated via an automatic classifier system and process.

A classifier is a function that maps an input attribute vector, x=(x1, x2, x3, x4, xn), to a confidence that the input belongs to a class, that is, f(x)=confidence(class). Such classification may employ a probabilistic and/or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence may be employed. Classification as used herein also is inclusive of statistical regression that is utilized to develop models of priority.

As will be readily appreciated from the subject specification, the subject innovation may employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to automatically learn and perform a number of functions, including but not limited to determining according to a predetermined criteria when to select an advertisement, where to render the advertisement (e.g., placement in the border), when to render the advertisement, etc.

By way of example, suppose a user is working within an application around lunchtime—here, the system may determine the time of day as well as the user location and selectively render advertisements related to eateries of a user's preference, e.g., based upon historical activity and preferences. Similarly, the system may monitor Internet browser activity and render advertisements based upon keywords, topics, etc. related to search queries and results located.

Figure 5:
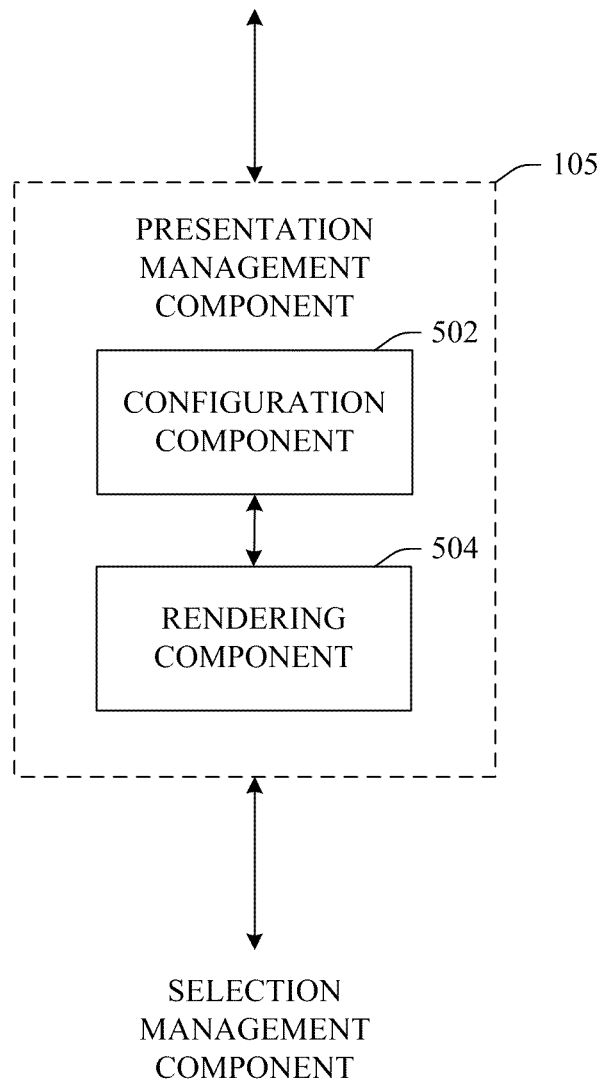
FIG. 5 illustrates an example block diagram of a presentation management component in accordance with aspects of the innovation.

Referring now to FIG. 5, an example block diagram of a presentation management component 105 in accordance with aspects of the innovation is shown. As illustrated, the presentation management component 105 may include a configuration component 502 and a rendering component 504. Together, these sub-components (502, 504) facilitate display of advertising content together with user content as described supra. In operation, the configuration component 502 may generate user and advertisement data as well as relationships between them. Additionally, this sub-component applies logic (e.g., rules, MLR) to effect arrangement and layout. The rendering component 504 facilitates display via an integral screen, external surface (e.g., via projection means) or combination thereof.

Figure 2A:
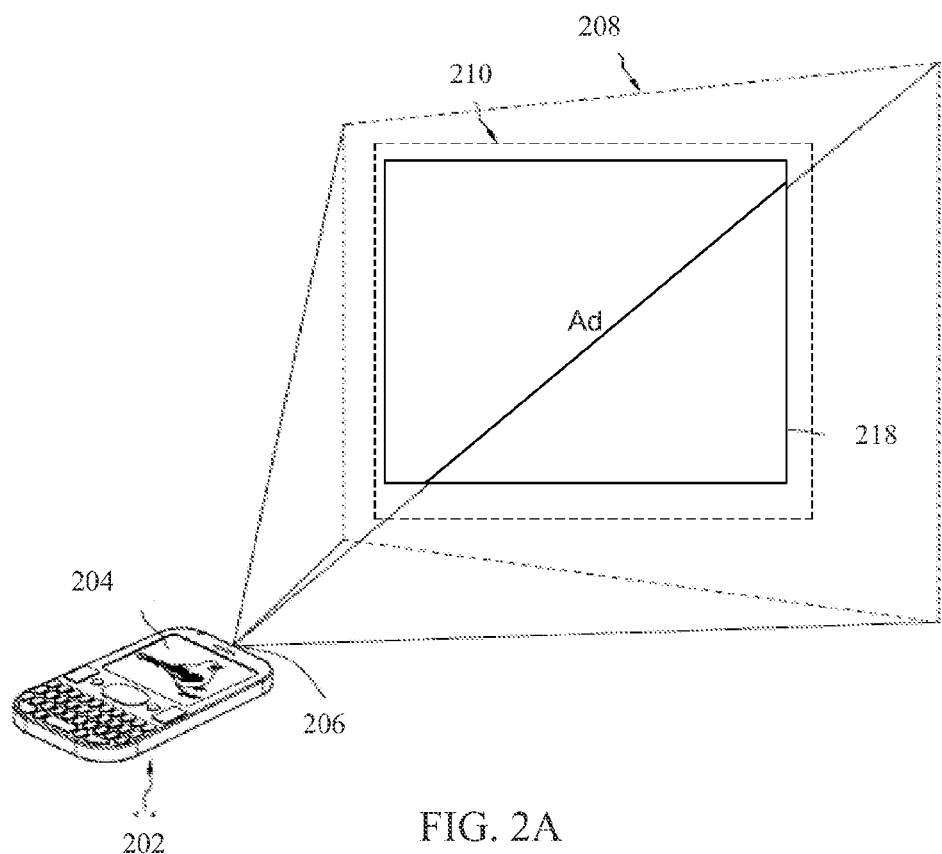
FIG. 2A illustrates a mobile computing device displaying content on an internal display and projecting an advertisement on an external receiving surface in accordance with some embodiments.
Figure 6:
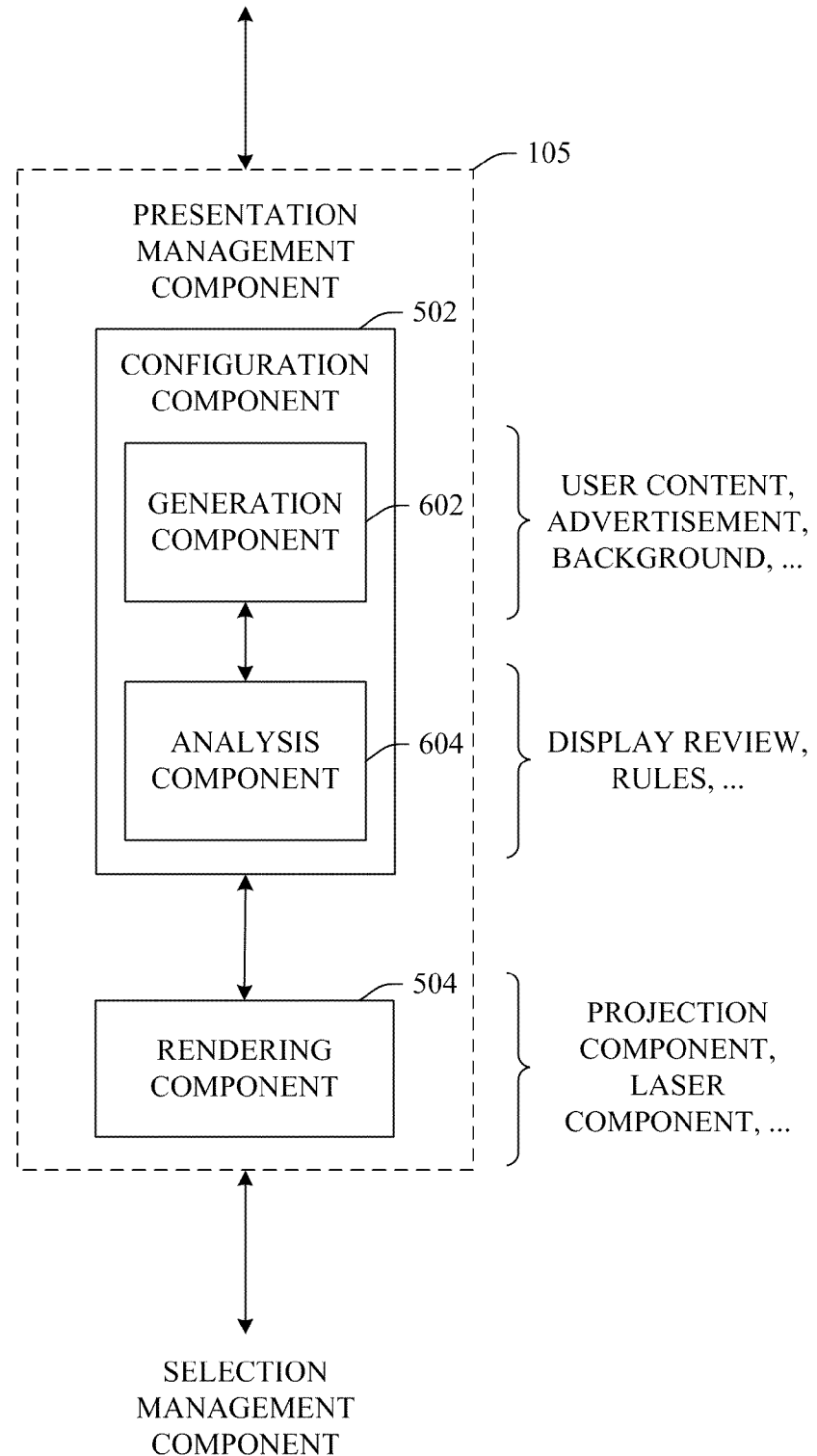
FIG. 6 illustrates an alternative example block diagram of a presentation management component in accordance with aspects of the innovation.

FIG. 6 illustrates an alternative example block diagram of a presentation management component 105 in accordance with aspects. As shown in FIG. 6, the configuration component 502 may be equipped with a generation component 602 and an analysis component 604. Together these sub-components (602, 604) may construct, arrange and organize content for display as described above. In other words, these sub-components (602, 604) enable efficient use of screen real estate while maintaining a positive user experience. The advertisement content may be displayed in such a manner so as to not interfere with the user's experience, for example as illustrated in FIG. 2A.

The generation component 602 may generate graphical representations of content and establish spatial relationships thereof. For example, based upon data provided (e.g., x-y coordinate information), spatial relationships may be established to ensure proper placement of advertisements in view of user content. The generation component 602 may establish the user content, advertisement content, background, area perimeters, etc. The rendering component 604 may ultimately deliver the images for user view.

As shown, an analysis component 604 may be used to apply rules based upon most any factors, including but not limited to, policies, preferences, or the like. Once the analysis is complete and the content is configured, the rendering component 604 may facilitate visual display. In aspects, the presentation may be via an integral screen within the mobile device. In other aspects, a projection module may be employed to display onto a surface. Still further, external monitors or display means may be employed without departing from the spirit and/or scope of the innovation. It is to be understood that combinations of internal and external displays are also possible without departing from the spirit and/or scope of the innovation. For example, the user content may be displayed upon an integral screen while, at the same time, a projection means may be employed to present advertisement content surrounding the user content onto an external surface. It will be understood that this may be particularly useful and effective, for instance, in presentation scenarios in front of an audience.

Figure 7:
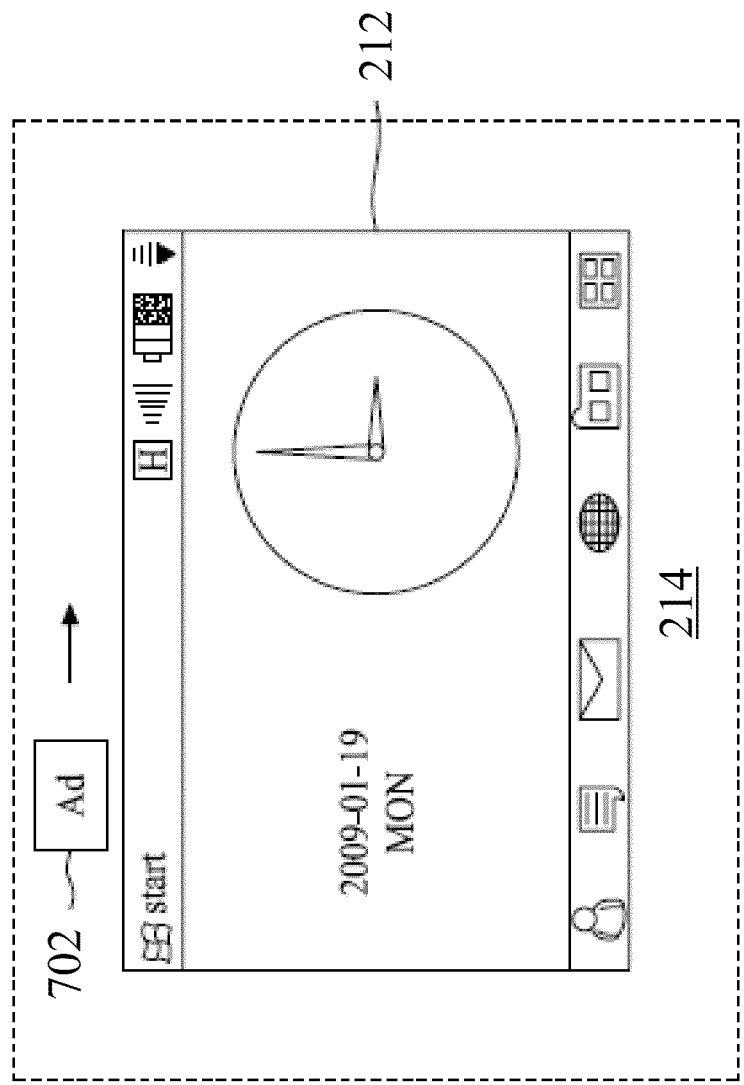
FIG. 7 illustrates a projected image in accordance with one of the embodiments of the innovation.

Turning now to FIG. 7, as shown, advertisement window 702 is able to move in the second area 214, rather than staying in a fixed or stationary position. In this manner, the advertisement window 702 does not interfere with the user content area 212. In embodiments, the movement of advertisement window 702 may be defined by area rules of a video output application as described herein. There may be a flow function being a default or an optional function for the information to be displayed in the second area 214 of the total projectable area.

In other embodiments, the movement of advertisement windows 702 may be defined by advertiser rules of the advertising management system 101 or by the advertiser content 109 itself. In addition to lateral motion, it is to be understood that many kinds of displaying formats in a network application (such as a browser) may be applied, for example, flowing windows, flash animation, marquee, news ticker, etc. According to area rules, all kinds of format of advertiser content 109 may be displayed in the second area 214.

Figure 8:
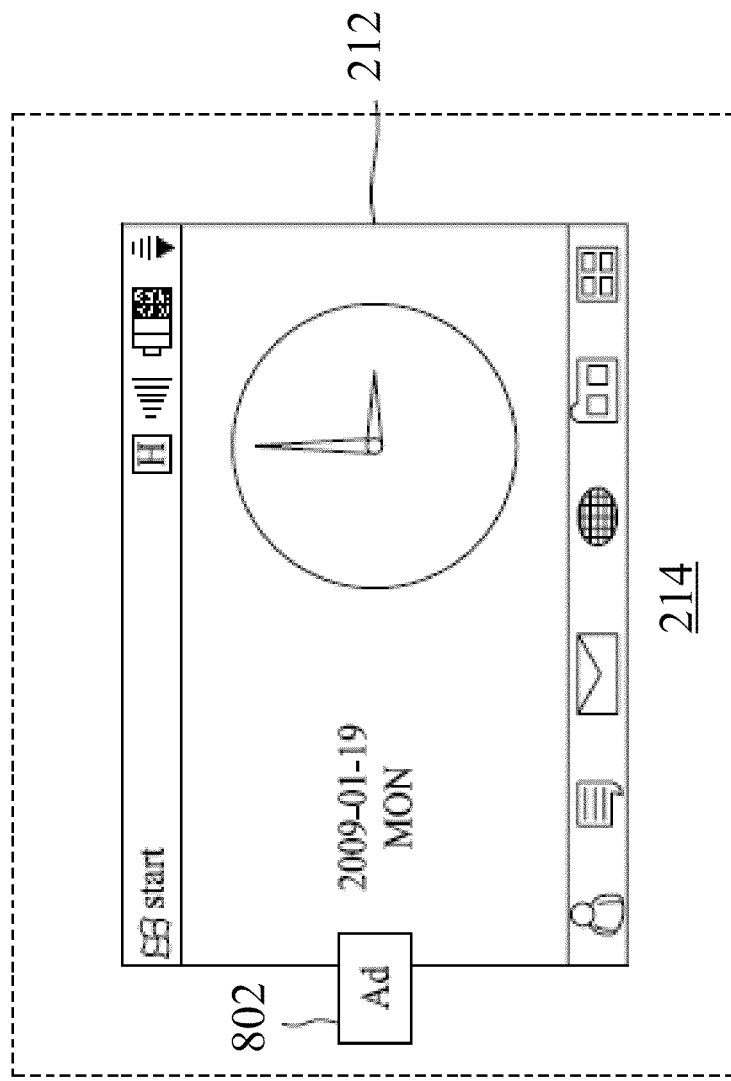
FIG. 8 illustrates a projected image in accordance with one of the embodiments of the innovation.

FIG. 8 shows an alternative arrangement of embodiments where the advertisement window 802 may be displayed/projected on a part of the first area 212 and on a part of the second area 214. In these aspects, it is to be understood that rules may be applied so as to alleviate interference with the user experience. For instance, the system may detect placement of a navigation pointer whereby the advertisement 802 moves out of the way of the pointer as the user controls. It will be understood that, in these aspects, the user may visualize the advertisement without interference or annoyance.

Figure 9:
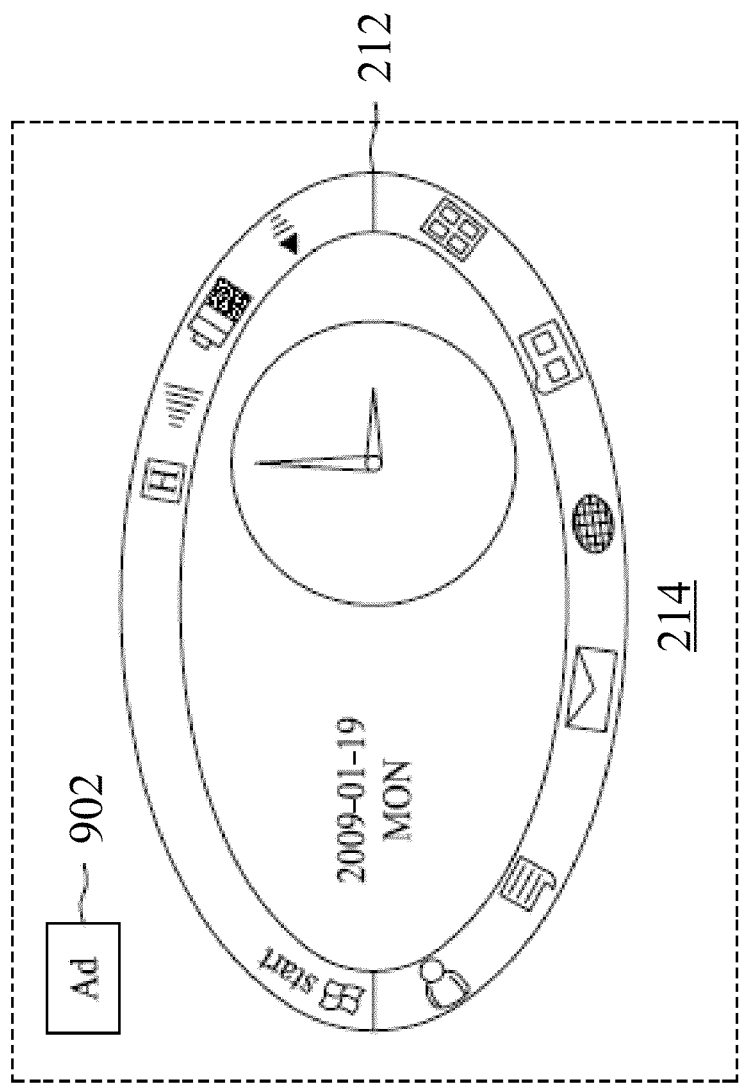
FIG. 9 illustrates a projected image in accordance with one of the embodiments of the innovation.

FIG. 9 illustrates shape of the background associated with the main GUI may be other shapes rather than rectangle as shown previously. It is to be understood and appreciated that this also means that, in some embodiments, the shape of the projected first area 212 may be of most any shape desired. For example, shapes similar to famous trademarks or logos may also bring commercial/advertising revenue. A perimeter for the non-rectangular shapes for first area 212 may then define the limits of user input as described above. In embodiments, the background data and perimeter is stored in the memory, specifically in a non-volatile memory to prevent user from changing default background shape that the manufacturer of computing device intends to present. In other embodiments, the shape of background/first area 212 may be changed according to advertising information received from a network. As shown, advertisement window 902 may also be displayed or projected in the second area 214 for delivering related advertising information associated with a background shape or other independent advertising information as appropriate or desired.

Figure 10:
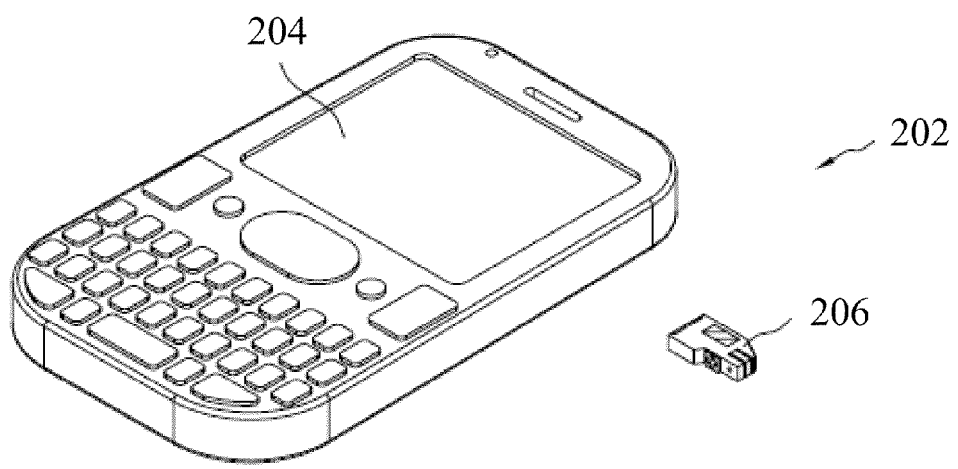
FIG. 10 illustrates an example projector module capable of being embedded within a mobile computing device.

Turning now to FIG. 10, a projector module 206 which may be embedded into or disposed integral to the mobile computing device 202 such as a cellular telephone is shown. As will be understood, size reduction is an important issue regarding to mobility of mobile computing device 202. In this regard, several embodiments of size-reduced projector modules 206 or projectors, which may be built in or plugged into to the mobile computing device 202 while also meeting the size-reducing requirement, are described hereafter.

Figure 11:
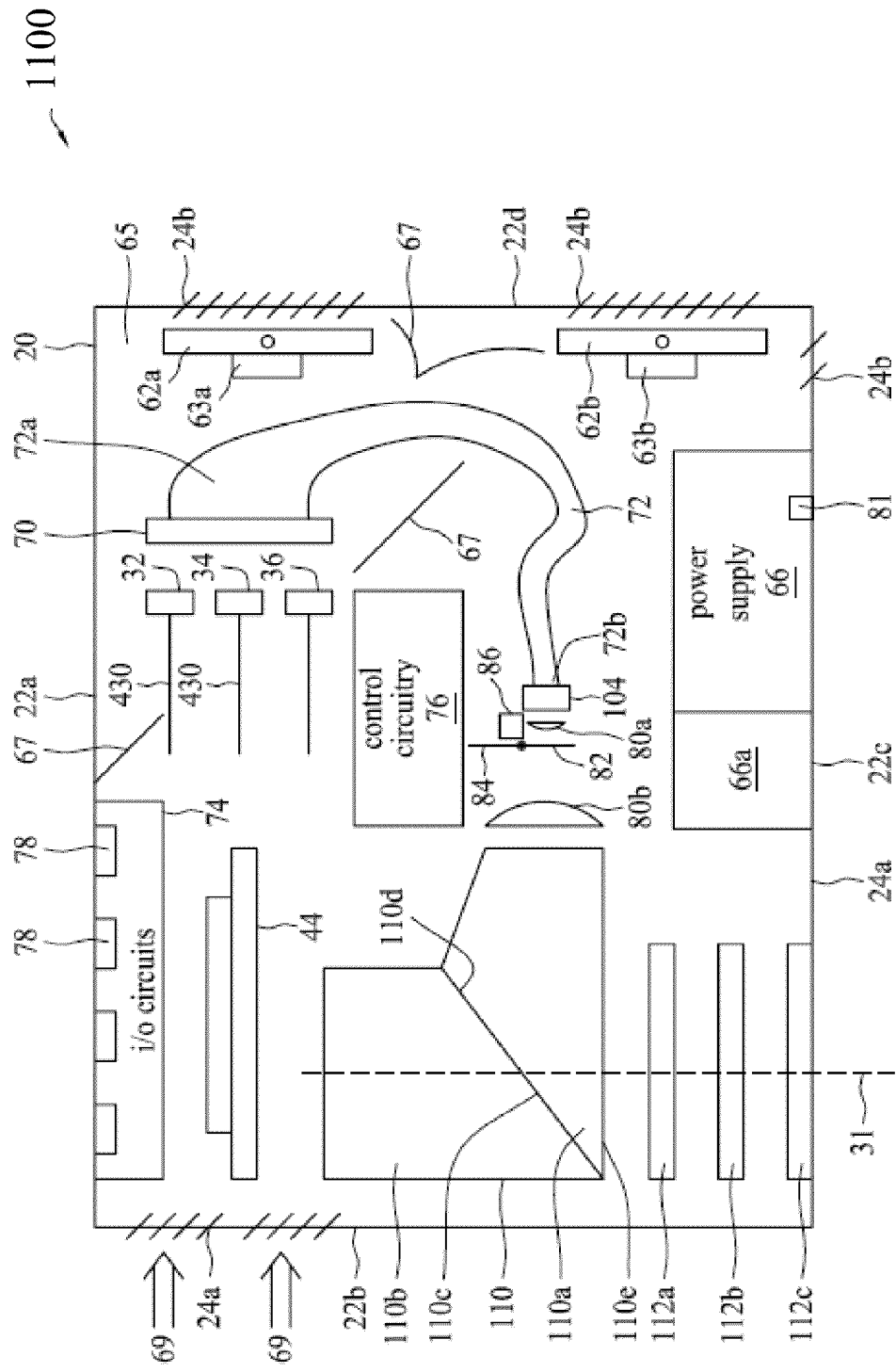
FIG. 11 illustrates an example schematic of a projector module in accordance with some embodiments of the innovation.

FIG. 11 illustrates a schematic of an example projector module 1100 in accordance with some embodiments. Projector module 1100 is configured to produce and project a video image on a receiving surface as described above. In aspects, the projector module 1100 employs lasers to generate light. In embodiments, projector module 1100 uses three sets of lasers—one for each primary color. As shown, projector module 1100 comprises a red laser set 32, a green laser set 34, a blue laser set 36, housing 20, optical modulator 44, fans 62, power supply 66, fiber optic interface 70, fiber optic cabling 72, input/output circuitry 74, control circuitry 76, input/output interfaces 78, coherence diffuser 82, relay optics 80, prism structure 110 and projection lens system 112.

Housing 20 defines outer dimensions of projector module 1100 and an inner chamber 65 within projector module 1100. Housing 20 also provides mechanical protection for internal components of projector module 1100. As shown, housing 20 comprises four walls 22*a-d*, a top wall (not shown), and a bottom wall (not shown). Walls 22 define the chamber 65 within housing 20. Walls 22*a-d* comprise a suitably rigid material that grants structural rigidity for projector module 1100 and mechanical protection for internal components within housing 20, such as a metal or molded plastic. One or more walls 22*a-d* of housing 20 may also include air vents 24 that permit airflow between chamber 65 and an environment external to housing 20. Vents 24 may also be placed on the top and bottom walls of housing 20.

Power supply 66 provides electrical power to red laser set 32, green laser set 34, blue laser set 36 and other components within projector module 1100 that consume electrical power. Thus, power supply 66 may provide electrical energy to control circuitry 76, input/output circuitry 74, fans 62 and optical modulator 44. A power cord port 81 receives a power cord, which couples power supply 66 to an AC power source such as a wall power supply. In embodiments, conversion of AC power to DC power occurs in a transformer included between ends of the power cord, as is common with many laptop computer power cords, thereby reducing the size of power supply 66 and projector module 1100 and increasing the portability of projector module 1100.

In other embodiments, power supply 66 comprises at least one rechargeable battery 66*a*. Battery 66*a* may be recharged using power provided through power cord port 81. Battery 66*a* allows projector module 1100 to operate on stored energy and without reliance on proximity to an AC power source, which further increases portability of projector module 1100. For example, inclusion of a battery in housing 20 extends projector module 1100 usage to settings where AC and fixed power outlets are not available or within reach.

Lasers as described herein, such as those included in red laser set 32, green laser set 34 and blue laser set 36, produce laser light having a wavelength between about 400 nanometers and about 700 nanometers, which is generally accepted as the visible spectrum. Laser light refers to light that is generated using a lasing mechanism which, in some cases, may be manipulated after initial generation to achieve a desired frequency, as will be described in further detail below. Red laser set 32, green laser set 34, and blue laser set 36 respectively produces red, green and blue laser light to be used as light source of the projector module 1100. In some other embodiments, light emitting diode (LED) is also capable of being adopted as the light source.

In embodiments, each laser emits substantially collimated light. Collimated light differs from radiant light (e.g., from a lamp or light emitting diode) and is characterized by light that travels in about the same direction. Laser light emitted from each laser may also be characterized as coherent. The coherency of laser light relates to the constancy of the spatial and temporal variations in the light or radiation wave fronts. A high degree of coherence implies a substantially constant phase difference between two points on a series of about equal amplitude wave fronts (spatial coherence); and a correlation in time between the same points on different wave fronts (temporal coherence). If a laser beam is considered as a plane wave traveling in one direction, it is spatially coherent due to the perpendicularity of wave fronts in the direction of propagation. Also, due to the roughly monochromatic nature of laser light emitted from lasers as described herein, the beam is generally temporally coherent, that is, it will display an about fixed phase relation between a portion of the beam emitted at one time and a portion emitted at another.

Red laser set 32 is designed or configured to produce red light for use in projector module 1100. In embodiments, each diode laser in red laser set 32 generates and emits red light including a wavelength between about 615 and about 690 nanometers. In embodiments, each diode laser in red laser set 32 includes a lasing medium and laser cavity configured to generate and emit light including a wavelength between about 625 and about 645 nanometers.

Green laser set 34 is designed or configured to produce green light for use in projector module 1100. In embodiments, each laser in green laser set 34 emits light including a wavelength between about 510 and about 570 nanometers. In embodiments, green diode laser set 34 comprises green laser light emitting diode pumped solid state lasers that each emit green light including a wavelength between about 530 nanometers and about 550 nanometers.

Blue laser set 36 is designed or configured to produce blue light for use in projector module 1100. In embodiments, each laser in blue laser set 36 emits blue light including a wavelength between about 420 and about 500 nanometers. In embodiments, blue laser set 16 includes blue diode lasers and each blue diode laser comprises a lasing medium and laser cavity for generating and emitting light including a wavelength between about 430 and about 460 nanometers.

In general, the combined power of lasers for each color set may be adapted according to a desired light intensity output for projector module 1100 and according to the light sensitivity of a viewer to each red, green and blue color, as one skilled in the art will appreciate. The power of an individual laser in a set may vary with design; while the number of lasers in each laser set will vary with the output power of individual lasers used in the set.

Each laser is installed on a circuit board 430, which mounts each laser installed thereon. Each circuitry provides electrical communication for each laser installed on circuit board 430. Multiple laser diodes may be mounted on a single circuit board 430 to reduce space occupied by laser sets, such as red laser set 32, green laser set 34 and blue laser set 36. The boards may also include one or more heat sinks in heat conduction communication with a laser, for cooling circuit boards 430 and individual lasers.

In embodiments, each laser in red laser set 32, green laser set 34 and blue laser set 36 includes a sensor that provides feedback regarding laser performance. For example, diode lasers in red laser set 32 may include a photodiode chip that provides optical feedback from each diode laser. Information from each photosensor is then provided to control circuitry 76 to provide an indication of laser output for each laser set.

Control circuitry 76 provides control signals to components within projector module 1100, and may route data from input/output circuitry 74 to appropriate components within projector module 1100. Thus, lasers in red laser set 32, green laser set 34 and blue laser set 36 receive control signals from control circuitry 76 that regulate when each laser is turned on/off. More specifically, control circuitry 76 receives video data included in a signal via one or more input/output interfaces 78 and input/output circuitry 74, converts the video data to pixel data on a sequential color frame basis, and delivers the sequential color pixel data to the optical modulator 44 and to each diode laser. In a combined light transmission path design between lasers in sets 32, 34 and 36 and optical modulator 44 where light is transmitted along a common light path that transmits red, green and blue light in a sequential red, green and blue order, control circuitry 76 synchronizes the timing of colored data sent to optical modulator 44 and on/off commands sent to red laser set 32, green laser set 34 and blue laser set 36 respectively.

Control circuitry 76 may also include and access memory that stores instructions for the operation of components within projector module 1100. For example, stored heat regulation instructions may specify control signals sent by control circuitry 76 to fans 62. One or more temperature sensors may also be disposed within housing 20 to facilitate thermal regulation. For example, a temperature sensor may be disposed proximate to input/output circuitry 74 and control circuitry 76 to monitor temperature levels and participate in closed loop temperature control within projector module 1100 as determined by stored logic implemented by control circuitry 76. Alternately, temperature sensors arranged for each diode laser may sense temperature levels for each laser and output information that affects fan usage based on stored instructions for desired laser temperature levels. Control circuitry 76 may comprise a commercially available processor, controller or microprocessor such as one of the Intel or Motorola family of chips, for example.

Input/output interfaces 78 are configured to receive at least one cable, wire, or connector, such as a cable for transmitting a video signal comprising video data from a digital computing device. Common ports suitable for use with input/output interfaces 78 include ports that receive S video cable, 6-pin mini DIN, VGA 15-pin HDDSUB, an audio cable, component RCA through an S-Video adaptor, composite video RCA cabling, a universal serial bus (USB) cable, fire wire, etc. Input/output interfaces 78 may also include an audio output port for receiving a wired connection from speakers included in a headphone or speaker system.

Input/output circuitry 74 provides an interface between control circuitry 76 and one or more interfaces from input/output interfaces 78. Input/output circuitry 74 and input/output interfaces 78 collectively permit communication between projector module 1100 and a device that outputs a video signal carrying video data. Video data provided to control circuitry 76 may be in a digital or an analog form (e.g., from a VCR (video cassette recorder). In some cases, input/output circuitry 74 and control circuitry 76 convert analog video signals into digital video signals suitable for digital control of an optical modulator 44 included in projector module 1100, such as a liquid crystal display "LCD" device or a digital micro mirror "DMD" device. Input/output circuitry 74 or control circuitry 76 may also include support software and stored logic for particular connector types, such as processing logic required for S-video cabling or a digital video signal. Control circuitry 76 includes or accesses stored logic in memory to facilitate conversion of incoming data types and enhances video compatibility of projector module 1100. Suitable video formats having stored conversion instructions within memory accessed by control circuitry 76 may include NTSC, PAL, SECAM, EDTV, and HDTV (1080i and 720p RGBHV), for example.

Fans 62a and 62b move air through chamber 65 of housing 20 for cooling components of projector module 1100. In embodiments, fans 62 draw air in through inlet air vents 24a on one side of housing 20 and exhaust heated air out of exhaust air vents 24b after the air has cooled internal components of projector module 1100 and walls of housing 20. One skilled in the art will appreciate that fan 62 and vent 24 placement will vary with internal component placement within light source chamber 65. Specifically, fan placements and airflow patterns affected by fans 62 within chamber 65 are designed according to individual temperature regulation requirements and heat generation contributions of components within housing 20. Typically, red laser set 32, green laser set 34 and blue laser set 36 and power supply 66 generate the largest proportion of heat within housing 20, while control circuitry 76, optical modulator 44 and input/output circuitry 74 represent temperature regulation priorities.

Correspondingly, inlet air 69 passes in through inlet air vents 24a, initially passes and cools optical modulator 44, control circuitry 76 and input/output circuitry 74 while the air is relatively cool, passes across power supply 66 and red laser set 32, green laser set 34 and blue laser set 36, and exits out exhaust air vents 24b. The exhaust air may also cool fan motors 63a and 63b, which rotate fans 62a and 62b, respectively. In embodiments, multiple fans 62 are used to permit a lower profile for housing 20. As one skilled in the art will appreciate, the number and size of fans 62 used will depend on heat generation within projector module 1100 and a desired airflow to maintain one or more heat dissipation goals. Chamber 65 may also include one or more vertical or horizontal airflow guides 67 within chamber 65 to direct and distribute airflow as desired. In embodiments, circuit boards 430 for red laser set 32, green laser set 34 and blue laser set 36 are vertically arranged perpendicular to the direction of airflow within chamber 65 and airflow guides 67 are arranged to direct cooling air across the surfaces of each circuit board 430.

In embodiments, light output from lasers in red laser set 32, green laser set 34 and blue laser set 36 is provided to fiber optic cabling 72. Fiber optic cabling 72 includes one or more fiber optic cables configured to transmit light from lasers in red laser set 32, green laser set 34 and blue laser set 36 along multiple or common optical paths to relay optics 80, which is disposed along a light path between an exit end of fiber optic cabling 72 and an optical modulator 44. Each cable of the fiber optic cabling 72 comprises an inlet end 72a configured to receive light from a laser in one of the laser sets 32, 34 or 36 and an outlet end 72b configured to outlet the laser light for transmission to relay optics 80, and subsequent transmission to optical modulator 44. Since fiber optic cabling 72 may be bent and flexibly positioned, fiber optic cabling 72 advantageously permits light transmission between lasers sets and relay optics 80 regardless of the positioning and orientation between the laser sets and relay optics 80. For example, this allows flexible arrangement of lasers in laser sets 32, 34 and 36, relay optics 80 and prism structure 110, which may be used to improve space conservation within housing 20, decrease the footprint of housing 20, and minimize projector module 1100 size.

The number of fiber optic cables will vary with design. Multiple fiber optic cables may be employed in a design where each cable services one or more lasers. Additionally, multiple fiber optic cables may be employed in a design where each cable is configured to transmit a primary color. For example, three fiber optic cables may be employed in which each cable transmits light from a primary color set along three different optical paths to three primary color dedicated optical modulators. Alternately, a common fiber optic cable may be used to transmit sequentially emitted red, green and blue light along a common light path to a single mirror-based optical modulator 44. Fiber optic cabling 72 may comprise single mode or multimode fibers such as those readily available from a wide variety of vendors known to those skilled in the art. In some cases, a converging lens is disposed at outlet end 72b when fiber optic cabling 72 is a single mode fiber to correct for any divergence resulting from light transmission within the single mode fiber optic cabling 72.

Fiber optic interface 70 is configured to facilitate transmission of light from each laser set into fiber optic cabling 72. Fiber optic interface 70 may include one or more fixtures that position and hold an inlet end for each fiber optic cable included in fiber optic cabling 72 such that light output from each laser set transmits into a fiber optic cable. Interface 70 may also include optics that direct light from the laser sets into fiber optic cabling 72. In embodiments, a single fiber optic cable is used in fiber optic cabling 72 and fiber optic interface 70 includes a lens system disposed between the outlet of each laser set and the inlet of the single fiber optic cable to direct light from each laser into the single cable. The lens system may comprise at least two lenses: a first lens to direct the light towards the fiber entrance and a second lens that re-collimates light entering the cable.

In other embodiments that implements a one-to-one laser to fiber optic cabling 72 relationship, fiber optic interface 70 holds the inlet end 72a for each fiber optic cabling 72 relatively close to the outlet of a single laser to receive light therefrom. Each cable in this case may include a converging lens at its inlet end that facilitates light capture and transmission into the fiber optic cable. In one-to-one embodiments, each fiber optic cable in fiber optic cabling 72 includes a fixture that permits attachment to a laser. For example, conventionally available fiber optic cables available from vendors such as Ocean Optics Inc. of Dunedin, Fla. include a detachable fixture with a thread that allows screwing and fixing of the fiber optic cable to a mating thread disposed on a laser housing. In this case, fiber optic interface 70 comprises the threaded fixture for each fiber optic cable and a mating thread is added to the laser housing.

In a common light path transmission embodiment, light from lasers in each laser set 32, 34 and 36 travels along a common path before receipt by optical modulator 44. In this case, red, green and blue light is provided to fiber optic cabling 72 in a time synchronous manner that corresponds to red, green and blue video data provided in a video signal to optical modulator 44.

Relay optics 80 convert light received from fiber optic cabling 72 to light flux suitable for transmission onto optical modulator 44 via prism structure 110. This may include shaping and resizing light flux received from fiber optic cable 72 using one or more lenses, and may include homogenizing intensity across the light flux distribution. To do so, relay optics 80 may comprise one or more lenses suitably spaced and arranged within housing 20. In embodiments, first lens 80a is selected and arranged to increase the area of light flux received from fiber optic cabling 72, while second lens 80b is selected and arranged to convert the divergent light transmitted by first lens 80a into substantially collimated flux for transmission onto optical modulator 44.

A rotating diffuser 82 is disposed between first lens 80a and second lens 80b. Rotating diffuser 82 comprises a transparent glass screen 84 that is rotated by a motor 86. As shown in FIG. 11, rotating diffuser 82 intercepts an unfocused beam, thereby reducing both temporal and spatial coherence, and reducing potential speckle in the output image. In other embodiments, rotating diffuser 82 is introduced into the light path between the exit the fiber optic cabling 72 and before receipt by lens 80a.

It is to be appreciated that rotating diffuser 82 may be arranged in other locations along the light path between generation of laser light in laser sets 32, 34 and 36 and output of the projected image from external projection lens 112c. For example, rotating diffuser 82 may be arranged proximate to a junction where light from multiple fiber optic cables is transmitted into a common fiber optic cable. In this case, rotating diffuser 82 may be arranged at the focus of a beam to only reduce temporal coherence while maintaining the spatial coherence (e.g., the ability for the beam to be focused to a point). Rotating diffuser 82 may also be arranged to intercept light between a laser and a fiber optic coupling, or between a final relay lens and prism structure 110, for example. In embodiments, the coherence diffuser is arranged to intercept laser light before it is expanded in flux area by any relay optics. Intercepting a small flux area light beam reduces the size of the glass screen 84 and coherence diffuser motor 86.

In embodiments, relay optics 80 comprises a pair of fly-eye lenses arranged in the optical path between laser sets 32, 34 and 36 and prism structure 110, such as between second lens 80b and prism structure 110. Cumulatively, the pair of fly-eye lenses re-distribute light uniformly across the flux transmitted onto optical modulator 44. The first fly-eye lens includes a plurality of lenses that spatially divide input light flux (e.g., from lens 80b) into a set of blocks or components that each comprise a portion of the total inlet flux area, and transmits light for each block to a corresponding block in the second fly-eye lens. The second fly-eye lens includes a plurality of lenses, the number of which is the same as the number of lenses in the first lens, and outputs light for each component to an object region to be illuminated in such a manner that the partial luminance fluxes from each lens are superimposed on each other at the object region.

In other embodiments, relay optics 80 comprises an integrator tunnel disposed in the optical path between laser sets 32, 34 and 36 and prism structure 110, such as between lens 80b and prism structure 110. The integrator tunnel uses total internal reflection to output luminous flux with an about uniformly distributed intensity across a shape determined by an output geometry at output end, which is typically rectangular. The outlet may also be dimensioned to match the aspect ratio of the downstream optical modulator 44. The integrator may comprise a solid glass rod such as those known and used in the art. If required, one or more lenses may be arranged to re-size flux output by the integrator tunnel from a size that exists at an output end to a size that is suitable for reception by optical modulator 44.

Prism structure 110 provides light to optical modulator 44 at predetermined angles, and transmits light from optical modulator 44 to the projection lens system 112 along output path 31. Prism structure 110 comprises prism components 110a and 110b that are separated by air space or bonding interface 110c. Bonding interface 110c is disposed at such an angle so as to reflect light provided from relay optics 80 towards optical modulator 44. In addition, bonding interface 110c allows light reflected by optical modulator 44 to transmit to projection lens system 112 along output path 31.

Optical modulator 44 selectively transmits or reflects light to provide an output image along output path 31. To do so, optical modulator 44 is supplied with video data included in a video signal and selectively transmits light according to the video data. The video data is typically provided to device 44 on a frame-by-frame basis according to individual pixel values. If the video data is not received by projector module 1100 in this format, control circuitry 76 in housing 20 converts the video data to a suitable format for operation of optical modulator 44. In embodiments, individual light modulation elements within optical modulator 44, which each correspond to an individual pixel on the output image, translate received digitized pixel values into corresponding light output for each pixel.

In embodiments, optical modulator 44 is a mirror based spatial light modulator, such as a digital micromirror device (or DMD, a trademark of Texas instruments Inc.) commercially available from Texas Instruments, Inc. Most any XGA or SVGA resolution chip in the SDR or DDR series is suitable for use with several embodiments. In this case, optical modulator 44 comprises a rectangular array of tiny aluminum micromechanical mirrors, each of which individually deflects about a hinged axis to selectively reflect output image light down output path 31, and reflect non-image light away from output path 31. The deflection state or angle of each mirror is individually controlled by changing memory contents of an underlying addressing circuit and mirror reset signal. The array of mirrors is arranged such that each mirror is responsible for light output of a single pixel in the video image. Control signals corresponding to pixel output are supplied to control electrodes disposed in the vicinity of each mirror, thereby selectively deflecting individual mirrors by electromagnetic force according to video data on a pixel by pixel basis. Light reflected by each mirror is then transmitted along output path 31, through prism structure 110, and out of projector module 1100 using projection lens system 112.

The arrangement of relay optics 80 and the faces of prism structure 110 control the illumination angles for optical modulator 44. After light reflection by individual mirrors of optical modulator 44, reflected light exits prism structure 110 towards lenses 112 along output optical path 31. Output projection path 31 characterizes a) the direction of image light selectively transmitted by optical modulator 44 within projector module 1100, and b) the direction of light output from projector module 1100. For light selectively transmitted by optical modulator 44, path 31 extends as a straight line from optical modulator 44 for elements in their 'on' state, through prism structure 110, and out external projection lens 112c.

A projection lens system 112 is disposed along output path 31 configured to project light transmitted by the optical modulator along path 31 from projector module 1100. Projection lens system 112 manipulates image light transmitted by optical modulator 44 along output path 31 such that a projected image cast on a receiving surface enlarges as distance from output lens 112c to the receiving surface increases. Projection lens system 112 comprises first projection lens 112a, second projection lens 112b and external projection lens 112c, each of which is disposed centrically along and orthogonal to output light path 31. Distances between each projection lens 112 may vary with a desired splay angle from external projection lens 112c, as may the number of projection lens system 112 used. In embodiments, projector module 1100 is designed for a short throw distance, such as between about six inches and about 15 feet. Projector module 1100 may also include one or more buttons or tools that allow a user to manually focus and manually zoom output from projection lens system 112.

In operation, light generated by lasers sets 32, 34 and 36 is collected by and transmitted within fiber optic cabling 72. Relay optics 80 convert light transmitted by fiber optic cabling 72 to a luminous flux size suitable for transmission onto optical modulator 44 via reflection within prism structure 110. Light propagating through prism component 110a reflects off a surface 110d at bonding interface 110c by total internal reflection and forms a reflected pre-modulated beam directed towards optical modulator 44. The reflected pre-modulated beam travels through prism component 110a to reach optical modulator 44, which selectively transmits light according to video data in a signal that corresponds to an image to be projected. Light output through exit face 110e is characterized by optical path 31, which propagates through projection lens system 112 that manipulate image light for enlarged display onto a screen or suitable receiving surface. Typically, the image is cast with a splay angle such that the image enlarges as the distance to a receiving surface increase.

Figure 12:
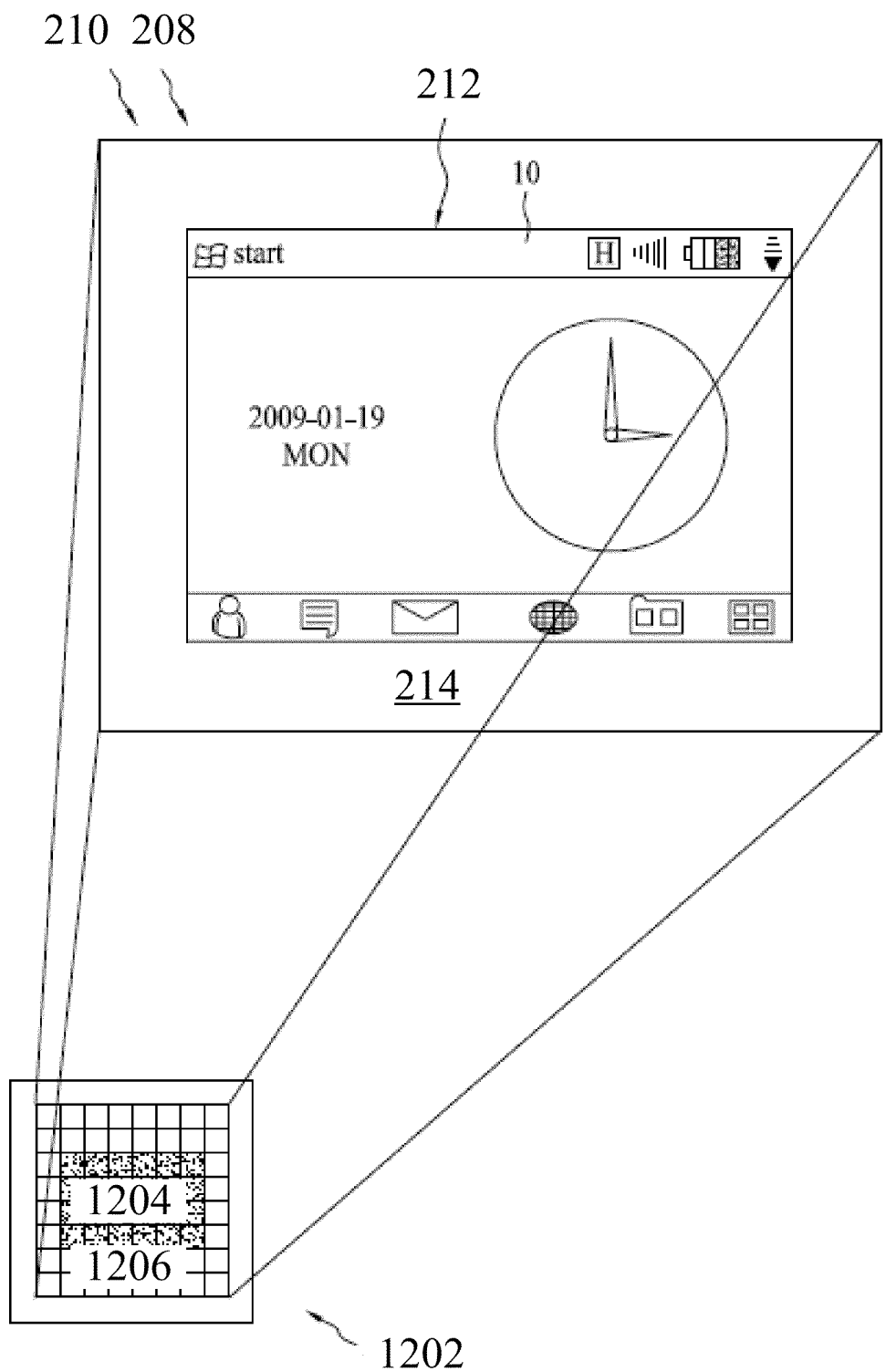
FIG. 12 illustrates an example relationship between an optical modulator and a projected image in accordance with some embodiments of the innovation.

FIG. 12 illustrates an example relationship between optical modulator 1202 and projected image of projector module 1100. In these embodiments, keystone distortion has not occurred; therefore keystone correction is not performed. Thus, the maximum image size 210 is substantially equal to total projectable area 208. The total projectable area 208 includes a first area 212 and a second area 214.

In these aspects, background 216 projected on the first area 212 is intended for use with a graphics-based user interface (GUI). In embodiments, only a first-portion of the optical modulator 1204 is used for modulating video output for background 216 and the associated GUI. Although the optical modulator 1202 is capable of projecting a larger image by using the whole optical modulator 1202, however, for projection-typed display is relatively capable of providing larger image size than other kinds of display known by skills in the art; user may still enjoy an output image with an acceptable large size. Also, because one of the natures of projection-typed display is the un-fixed output image size, unlike LCD or CRT monitors having a fixed frame, a user cannot easily find the second-portion of optical modulator 1206 is not used for the main GUI. When there is no information to be projected on the second area 214, the pixel units of the second-portion of optical modulator 1206 are set in "off" state if DLP chip is adopted for using as optical modulator. In the embodiments using LCD or LCOS technology for the optical modulator 1202, the pixel units of the second-portion of optical modulator 1206 are set as "black" state.

Figure 13:
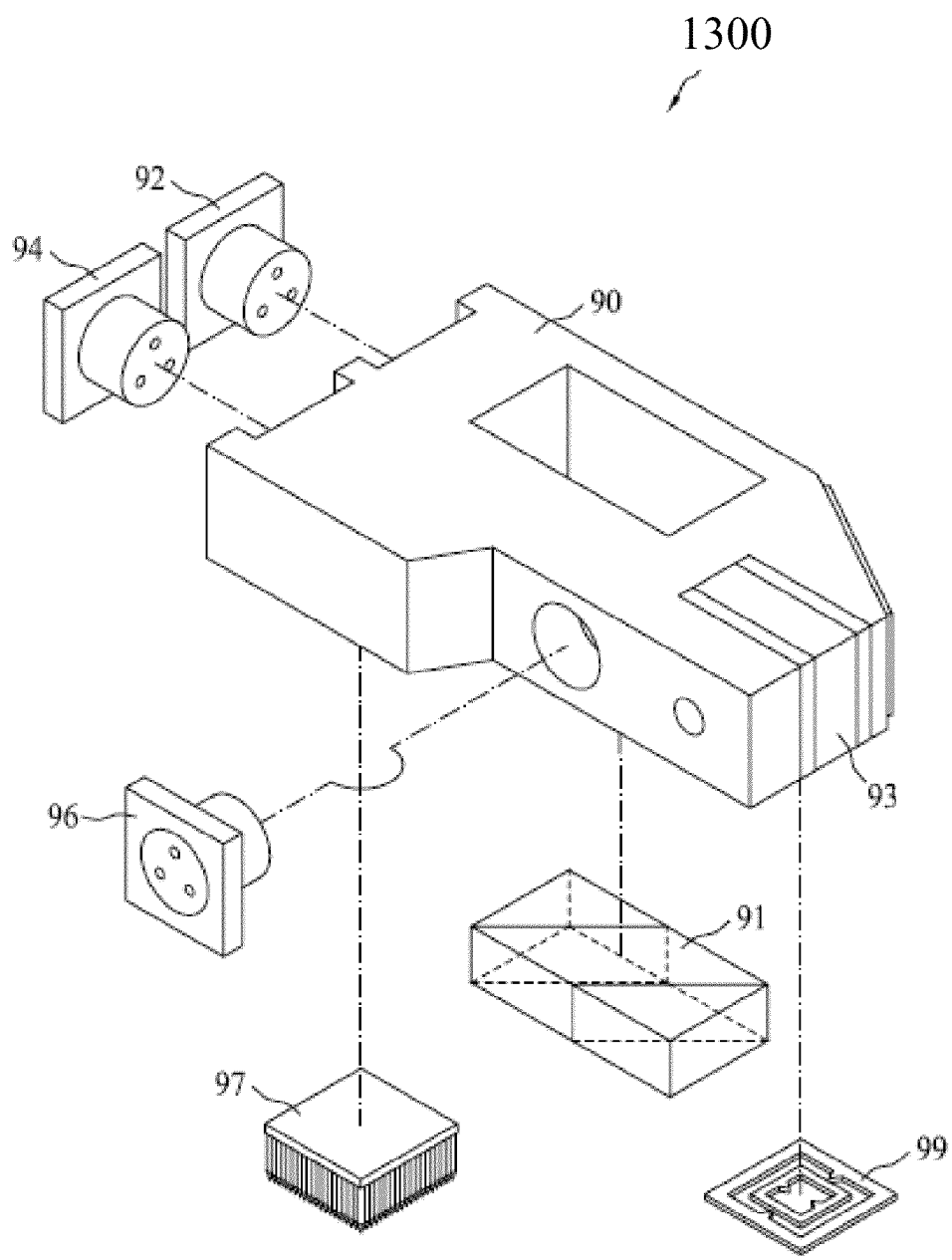
FIG. 13 illustrates an explosive chart of an example projector module in accordance with some embodiments of the innovation.

FIG. 13 illustrates another type of projector module which is employed in some embodiments. Projector module 98 includes housing 90, red laser set 92, green laser set 94, blue laser set 96, combiner optics 91, control circuitry 97, micro scanner 99, input/output circuitry (not shown), input/output interfaces (not shown), power supply (not shown) and projection lens system 93.

Housing 90 defines outer dimensions of projector module 98 and a chamber within projector module 98. Housing 90 also provides mechanical protection for internal components of projector module 98. Housing 90 may also include air vents that permit airflow between chamber of housing 90 and external environment. Vents may also be placed on the housing 90. Power supply provides electrical power to red laser set 92, green laser set 94, blue laser set 96 and other components within projector module 98 that consume electrical power. Thus, power supply may provide electrical energy to control circuitry, input/output circuitry, fans, control circuitry 97 and micro scanner 99.

Several different embodiments of red laser set 92, green laser set 94 and blue laser set 96 such as those described with FIG. 11 may be applied. The combiner optics 91 receives red, green and blue laser light from red laser set 92, green laser set 94 and blue laser set 96 respectively and provides a combined laser beam to micro scanner 99. The input/output circuitry provides video signal, from input/output interfaces, to control circuit 97. The control circuit 97 controls red laser set 92, green laser set 94 and blue laser set 96 respectively. During a time frame of pixel, red laser set 92, green laser set 94 and blue laser set 96 respectively generates predetermined power of laser corresponding to a predetermined gray scale of red, green or blue based on control signals from control circuitry 97. The red, green and blue lasers are mixed or combined as a predetermined color laser beam to be projected on receiving surface as a pixel. At the next time frame of pixel, red laser set 92, control circuit 97 controls green laser set 94 and blue laser set 96 generating predetermined power of laser so as to form a predetermined color of the next pixel.

Figure 14A:
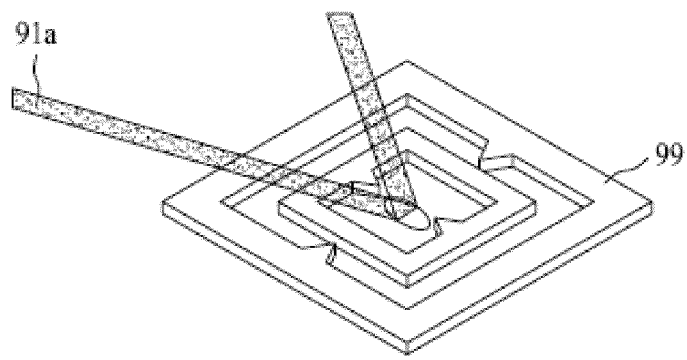
FIG. 14A illustrates a micro scanner at a first predetermined time frame in accordance with aspects of the innovation.
Figure 14B:
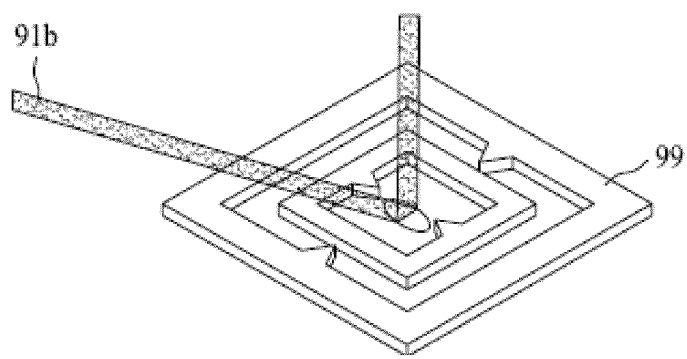
FIG. 14B shows a micro scanner at a second predetermined time frame in accordance with aspects of the innovation.
Figure 14C:
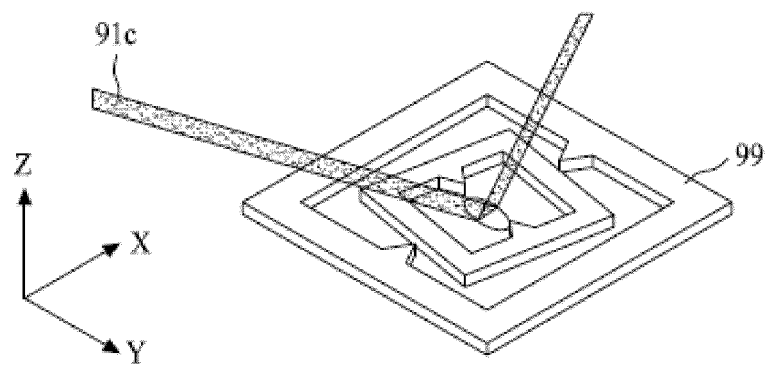
FIG. 14C shows a micro scanner at a third predetermined time frame in accordance with aspects of the innovation.

The combiner optics 91 output a predetermined color laser beam at a time frame of pixel; each predetermined color laser is used to form a pixel of projected image. FIGS. 14A-C illustrate an example working manner of micro scanner 99. A first predetermined color laser beam 91a is outputted from combiner optics at a first time frame of pixel; a second predetermined color laser beam 91b is outputted from combiner optics at a second time frame of pixel; a third predetermined color laser beam 91c is outputted from combiner optics at a third time frame of pixel. Micro scanner 99 may be a MEMS (Micro Electro Mechanical Systems) mirror which, in embodiments, comprises a single mirror and is two-axis (X-Y) rotatable.

Micro scanner 99 is controlled by the control circuitry 97 to have a predetermined tilt angle along the X axis and a predetermined tilt angle along the Y axis in a time frame of pixel, so as to reflect laser beam, such as the first predetermined color laser beam 91a, the second predetermined color laser beam 91b or the third predetermined color laser beam 91c, to corresponding pixel location. Based on the coordination of changing color of laser beam and changing tilt angle of the micro scanner 99, video image may be projected on an external receiving surface by a scanning manner.

Figure 15:
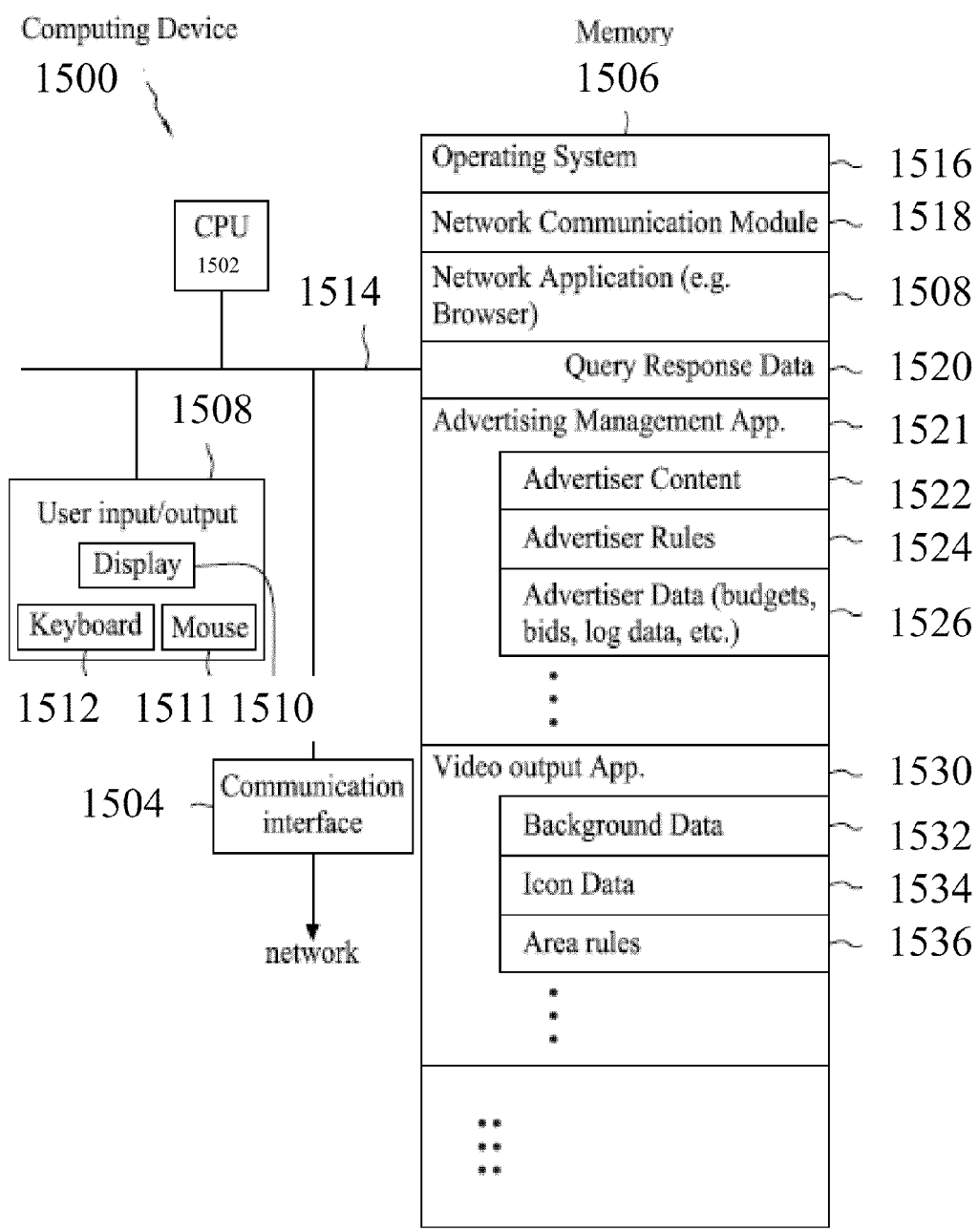
FIG. 15 illustrates an example block diagram illustrating a computing device in accordance with some embodiments of the innovation.

FIG. 15 illustrates an example block diagram illustrating a computing device in accordance with some embodiments. Computing device 1500 may be any computer, such as desktop computer, laptop or notebook computer, personal data assistance (PDA) device or mobile phone.

Computing device 1500 includes one or more processors (CPU's) 1502, one or more network or other communications interfaces 1504, memory 1506, and one or more communication buses 1514 for interconnecting these components. Computing device 1500 may include a user interface 1508 comprising a display device 1510, a mouse 1511 and a keyboard 1512. In embodiments, display device 1510 may be a projector; in other embodiments, display device 1510 may include both of a LCD screen and a projector. The LCD screen may also incorporate touch-panel function in other embodiments.

Memory 1506 may include high speed random access memory and may also include non-volatile memory, such as one or more magnetic disk storage devices. Memory 1506 may optionally include one or more storage devices remotely located from the processor 1502. The memory 1506 in computing device 1500 may store the following programs, modules and data structures, or a subset or superset thereof. An operating system 1516 includes procedures for handling various basic system services and for performing hardware dependent tasks. A network communication module 1518 is used for connecting computing device 1500 to remote server or other computers.

In practice, the distribution of advertising program management and data storage functions between computing device 1500 and an associated, though communication interface 1504 and network, advertisement computer/server may be divided up in many different ways. In some embodiments, advertising management application 1521 is an applet running in network application 1508 (e.g., a web browser), with the advertiser content 1522 and rules 1524 being input at computing device 1500, but stored in the advertisement computer/server.

In other embodiments, advertising management application 1521 is a separate application. In some embodiments, an advertiser's rules for how their online advertising program is to be modified in response to alerts/notifications are stored only in advertiser rules 1524 on computing device 1500, rather than in the advertisement computer/server. In other embodiments, all of an advertiser's rules, including their rules for how their online advertising program is to be modified in response to alerts/notifications, are stored in both advertiser rules 1524 in the local computing device 1500 and the remote advertisement computer/server.

A network application 1508, such as a web browser, is used in some embodiments to view real-time advertising statistics, including query response data 1520; query response data 1520 is the data retrieved through network from remote database service, such as search result from a search engine; it is in response to user's query through network application 1508, such as web browser. Advertisement management application 1521 manages the online advertising program for a particular advertiser and includes advertiser content 1522 that contains the advertisements used in a particular advertiser's online advertising program; advertiser rules 1524 specify the online advertising program for a particular advertiser; and advertiser data 1526 includes non-streamed data (e.g., advertisers' budgets, bids, account balances, etc.) that are used to manage a particular advertiser's online advertising program.

In embodiments, while the computing device 1500 employs a projector as its display device 1510, a total projectable area of the projector is divided into a first area and a second area by the video output application 1530 according to area rules 1536; the video output application 1530 may also manage background data 1532 and/or icon data 1534 for the operating system 1516. The first area is used for displaying the main GUI of the operating system 1516. Background may be projected to cover the whole first area; and icons may be displayed on background. In some embodiments, after a user sends a query through network application 1508 such as an internet browser, query response data 1520 may be projected and displayed in the first area in such browser; and related advertiser content 1522 is projected and displayed in the second area by applying area rules 1536.

In these embodiments, user will not find the background or the main GUI being occupied by advertiser content 1522. The pixel-based video information to be provided to the display device 1510, such as projector, may be provided by the processor 1502, or a GPU in other embodiments, including a first-portion video output and a second-portion video output. The first-portion video output and the second-portion video output join as a video output signal, which provides video information in order of image frames; and in each image frames, in a predetermined order of pixels.

In other embodiments, such as those illustrated and discussed with regard to FIG. 2 above, the mobile computing device may include a built-in screen and projector module. It is to be understood and appreciated that the video output application 1530 may apply area rules 1536 to define the whole display area of the built-in screen as the first area which is associated with the main GUI; and the second area is only displayed by the projector module. These aspects are to be included within the scope of this specification and claims appended hereto.

Each of the above identified modules and applications correspond to a set of instructions for performing a function described above. These modules (e.g., sets of instructions) need not be implemented as separate software programs, procedures or modules, and thus various subsets of these modules may be combined or otherwise re-arranged in various embodiments. In some embodiments, memory 1506 may store a subset of the modules and data structures identified above. Furthermore, memory 1506 may store additional modules and data structures not described above.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a display component configured to display an image; and
a presentation management component configured to:
generate the image to include:
a first display area shaped in the form of a logo associated with an advertisement content;
a second display area that is outside of a perimeter of the first display area;
a non-advertisement content in the first display area; and
the advertisement content in the second display area; and
change the shape of the first display area to form another logo in response to a change in the advertisement content.

2. The device of claim 1, wherein the display component is a projector module that comprises a light source configured to generate light, a projection lens system, and an optical modulator-configured to modulate the light from the light source and form the image on an external receiving surface via the projection lens system.

3. The device of claim 2, wherein the light source comprises a light emitting diode.

4. The device of claim 2, wherein the light source comprises a diode laser.

5. The device of claim 1, wherein the projector module comprises:
a controller configured to receive a video signal;
a light source configured to emit a light beam modulated by the controller; and
a micro scanner positioned to receive the light beam and configured to be controlled by the controller to scan the light beam into a projectable area.

6. The device of claim 5, wherein the light source comprises a red laser, a green laser, and a blue laser coupled to the controller, and a combiner optics module configured to receive respective laser beams from the red laser, the green laser, and the blue laser, and to output the light beam.

7. The device of claim 5, wherein the micro scanner is a micro electronic mechanical system minor.

8. A method, comprising:
generating, by a device including a processor, a non-advertisement content and an advertisement content;
defining a first display area in a shape of a logo associated with the advertisement content;
defining a second display area that is outside of a perimeter of the first display area;
positioning the non-advertisement content in the first display area;
positioning the advertisement content in the second display area; and
changing the shape of the first display area to form another logo based on a change in the advertisement content.

9. The method of claim 8, further comprising displaying the first display area and the second display area on an integrated screen of the device.

10. The method of claim 8, further comprising projecting, by the device, the first display area and the second display area externally to the device.

11. A system, comprising:
means for generating a non-advertisement content;
means for generating an advertisement content;
means for generating a first display area in a shape of a logo associated with the advertisement content;
means for generating a second display area that is outside of a perimeter of the first display area;
means for placing the non-advertisement content in the first display area;
means for placing the advertisement content in the second display area; and
means for altering the shape of the first display area to another logo using a change in the advertisement content.

12. A non-transitory computer readable medium comprising computer-executable instructions that, in response to execution, cause a device to perform operations, comprising:

obtaining a non-advertisement content;

obtaining an advertisement content;

configuring a first display area in a shape of a logo associated with the advertisement content;

configuring a second display area that is outside of a perimeter of the first display area;

positioning the non-advertisement content in the first display area;

positioning the advertisement content in the second display area; and adjusting the shape of the first display area to another shape of another logo in response to a change in the advertisement content.

* * * * *

UNITED STATES PATENT AND TRADEMARK OFFICE
CERTIFICATE OF CORRECTION

| | | |
|---|---|---|
| PATENT NO. | : 8,579,442 B2 | Page 1 of 1 |
| APPLICATION NO. | : 12/472534 | |
| DATED | : November 12, 2013 | |
| INVENTOR(S) | : Plut | |

It is certified that error appears in the above-identified patent and that said Letters Patent is hereby corrected as shown below:

In the Specifications

In Column 12, Line 19, delete "recorder)." and insert -- recorder)). --, therefor.

In the Claims

In Column 20, Line 34, in Claim 7, delete "minor." and insert -- mirror. --, therefor.

Signed and Sealed this
Thirteenth Day of May, 2014

Michelle K. Lee
*Deputy Director of the United States Patent and Trademark Office*